US012693606B2

(12) United States Patent
Yamamoto et al.

(10) Patent No.: US 12,693,606 B2
(45) Date of Patent: Jul. 28, 2026

(54) METHOD FOR PRODUCING ELECTROSTATIC IMAGE DEVELOPING TONER

(71) Applicant: FUJIFILM Business Innovation Corp., Tokyo (JP)

(72) Inventors: Keita Yamamoto, Kanagawa (JP); Daisuke Noguchi, Kanagawa (JP); Yuji Isshiki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 889 days.

(21) Appl. No.: 17/950,561

(22) Filed: Sep. 22, 2022

(65) Prior Publication Data

US 2023/0314970 A1 Oct. 5, 2023

(30) Foreign Application Priority Data

Mar. 15, 2022 (JP) ................................ 2022-040310

(51) Int. Cl.
*G03G 9/08* (2006.01)
*G03G 9/087* (2006.01)

(52) U.S. Cl.
CPC ....... *G03G 9/0806* (2013.01); *G03G 9/08711* (2013.01); *G03G 9/08755* (2013.01)

(58) Field of Classification Search
CPC .......................... G03G 9/0804; G03G 9/0815
See application file for complete search history.

(56) References Cited

U.S. PATENT DOCUMENTS 10,539,896 B1 * 1/2020 Nosella .............. G03G 9/09321
2015/0044606 A1 * 2/2015 Mang ................. G03G 9/09708
430/109.3

FOREIGN PATENT DOCUMENTS

JP 2004-279598 A 10/2004
JP 2008-281688 A 11/2008
JP 2018-4880 A 1/2018
JP 2018-10286 A 1/2018
JP 2019-61054 A 4/2019
WO WO 2011/096733 * 8/2011 ............... G03G 9/08

OTHER PUBLICATIONS

Translation of WO 2011/096733.*
Communication dated Oct. 21, 2025, issued in Japanese Application No. 2022-040310.

* cited by examiner

*Primary Examiner* — Peter L Vajda
(74) *Attorney, Agent, or Firm* — Sughrue Mion, PLLC

(57) ABSTRACT

A method for producing an electrostatic image developing toner includes a step 1 of producing toner particles by a wet process, the toner particles including an amorphous polyester resin, a crystalline polyester resin, and a vinyl resin, and a step 2 of bringing acidic water into contact with the toner particles.

8 Claims, No Drawings

METHOD FOR PRODUCING ELECTROSTATIC IMAGE DEVELOPING TONER

CROSS-REFERENCE TO RELATED APPLICATIONS

This application is based on and claims priority under 35 USC 119 from Japanese Patent Application No. 2022-040310 filed Mar. 15, 2022.

BACKGROUND

(i) Technical Field

The present disclosure relates to a method for producing an electrostatic image developing toner.

(ii) Related Art

Japanese Laid Open Patent Application Publication No. 2004-279598 proposes a method for producing an electrostatic image developing toner which includes a wet process, in which toner particles are produced by performing granulation in water, an organic solvent, or a mixed solvent of water and an organic solvent to form colored resin particles and washing and drying the colored resin particles. In the production method, the colored resin particles are filtered out from a liquid medium by a cake washing method and, while the colored resin particles are maintained in the form of cake, they are washed with water. Furthermore, an ion exchange reaction of acidic groups present on the surfaces of the toner particles is performed.

SUMMARY

Aspects of non-limiting embodiments of the present disclosure relate to a method for producing an electrostatic image developing toner which includes a step of producing toner particles including an amorphous polyester resin, a crystalline polyester resin, and a vinyl resin by a wet process, with which an electrostatic image developing toner that may reduce the occurrence of colored streaks or colored spots is produced compared with the case where acidic water is not brought into contact with the toner particles.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing an electrostatic image developing toner, the method including a step 1 of producing toner particles by a wet process, the toner particles including an amorphous polyester resin, a crystalline polyester resin, and a vinyl resin; and a step 2 of bringing acidic water into contact with the toner particles.

DETAILED DESCRIPTION

Exemplary embodiments of the present disclosure are described below. The following description and Examples are merely illustrative of the exemplary embodiments and are not restrictive of the scope of the present disclosure.

In the present disclosure, when numerical ranges are described in a stepwise manner, the upper or lower limit of a numerical range may be replaced with the upper or lower limit of another numerical range, respectively. In the present disclosure, the upper and lower limits of a numerical range may be replaced with the values described in Examples below.

Each component may include a plurality of substances that correspond to the component.

In the present disclosure, in the case where a composition includes a plurality of substances that correspond to a component of the composition, the content of the component in the composition is the total content of the substances in the composition unless otherwise specified.

In the present disclosure, the term "step" used herein refers not only to an individual step but also to a step that is not distinguishable from other steps but achieves the intended purpose of Step.

Method for Producing Electrostatic Image Developing Toner

A method for producing an electrostatic image developing toner (hereinafter, "electrostatic image developing toner" is referred to also as "toner") according to this exemplary embodiment includes a step 1 of producing toner particles by a wet process, the toner particles including an amorphous polyester resin, a crystalline polyester resin, and a vinyl resin, and a step 2 of bringing acidic water into contact with the toner particles.

The method for producing a toner according to this exemplary embodiment enables the production of a toner that may reduce the occurrence of colored streaks or colored spots. The reasons are presumably as follows.

In the case where a toner including an amorphous polyester resin and a crystalline polyester resin is produced by a wet process, the amount of sodium ions that remain on the surfaces of the toner particles is likely to be large. Since, in a wet process, an alkali, a sodium salt, or the like may be added in order to, for example, adjust pH and a surfactant may be added in order to enhance dispersion stability, the sodium ions that remain on the surfaces of the toner particles are considered to result from the alkali, the sodium salt, the surfactant, or the like.

The surfaces of toner particles that include an amorphous polyester resin and a crystalline polyester resin include the carboxyl groups (—COOH) included in the amorphous polyester resin and the crystalline polyester resin. It is considered that sodium ions remain on the surfaces of the toner particles as a result of the hydrogen atoms included in the carboxyl groups being replaced with sodium ions in the production of the toner particles. Moreover, in the case where a surfactant including a sodium ion is used, it is also considered that sodium ions remain on the surfaces of the toner particles as a result of the surfactant adsorbing onto the surfaces of the toner particles.

In the production of toner particles that include an amorphous polyester resin and a crystalline polyester resin, the amorphous polyester resin and the crystalline polyester resin are likely to form a noncrystallization region since they have a high affinity for each other. Since the noncrystallization region is likely to capture a surfactant, a surfactant is likely to adsorb onto the surfaces of the toner particles. It is difficult to remove the surfactant captured in the noncrystallization region. Therefore, in the case where a toner including an amorphous polyester resin and a crystalline polyester resin is produced by a wet process, the amount of sodium ions that remain on the surfaces of the toner particles is likely to be large.

If toner particles that include a large amount of sodium ions remaining on the surfaces are used to form an image, image defects, such as colored streaks (i.e., unwanted line-like images) or colored spots (i.e., unwanted dot-like images) are likely to occur.

The method for producing a toner according to this exemplary embodiment includes a step 1 of producing toner particles by a wet process, the toner particles including an amorphous polyester resin, a crystalline polyester resin, and a vinyl resin. Since a vinyl resin has a low affinity for an amorphous polyester resin and a crystalline polyester resin, the vinyl resin is likely to cause phase separation in the binder resin in the production of the toner particles. When the vinyl resin causes phase separation, the segmental movement of the crystalline polyester resin occurs, which facilitates the crystallization of the crystalline polyester resin. This reduces the formation of the above-described noncrystallization region and the likelihood of a surfactant adsorbing onto the surfaces of the toner particles.

Furthermore, the method for producing a toner according to this exemplary embodiment includes a step 2 of bringing acidic water into contact with the toner particles. Bringing acidic water into contact with the toner particles causes the sodium ions to be replaced with protons by ion exchange.

For the above reasons, in the method for producing a toner according to this exemplary embodiment, the amount of sodium ions that remain on the surfaces of the toner particles is likely to be small. This enables the production of a toner that may reduce the occurrence of colored streaks or colored spots.

It is considered that, for the above reasons, the method for producing a toner according to this exemplary embodiment enables the production of a toner that may reduce the occurrence of colored streaks or colored spots.

Step 1

The step 1 is a step of producing toner particles by a wet process, the toner particles including an amorphous polyester resin, a crystalline polyester resin, and a vinyl resin.

Examples of the wet process include aggregation coalescence, suspension polymerization, and dissolution suspension.

Among these, aggregation coalescence may be used for producing the toner particles.

A method for producing the toner particles in which aggregation coalescence is used as an example of the wet process is described below.

For example, in the case where aggregation coalescence is used to produce the toner particles, the toner particles may be produced by the following steps:

a step of preparing a resin particle dispersion liquid that includes particles of a resin serving as a binder resin which are dispersed therein (i.e., resin particle dispersion liquid preparation step);

a step of causing the resin particles (as needed, other particles) to aggregate together in the resin particle dispersion liquid or a dispersion liquid that is a mixture of the resin particle dispersion liquid and another particle dispersion liquid to form aggregated particles (i.e., aggregated particle formation step); and a step of heating the aggregated particle dispersion liquid including the aggregated particles dispersed therein to cause fusion and coalescence of the aggregated particles and form toner particles (i.e., fusion coalescence step).

Each of the above steps is described below in detail.

Hereinafter, a method for preparing toner particles including a colorant and a release agent is described. However, it should be noted that the colorant and the release agent are optional. It is needless to say that additives other than a colorant or a release agent may be used.

Resin Particle Dispersion Liquid Preparation Step

The resin particle dispersion liquid preparation step is a step of preparing a resin particle dispersion liquid that includes particles of a resin serving as a binder resin which are dispersed therein.

In the resin particle dispersion liquid preparation step, for example, a colorant particle dispersion liquid in which particles of a colorant are dispersed and a release agent particle dispersion liquid in which particles of a release agent are dispersed are also prepared.

Resin Particle Dispersion Liquid

The resin particle dispersion liquid includes resin particles and a dispersion medium and may optionally include a surfactant.

As resin particles, resin particles including an amorphous polyester resin, resin particles including a crystalline polyester resin, and resin particles including a vinyl resin may be prepared individually.

Specifically, as resin particle dispersion liquids, a resin particle dispersion liquid in which the resin particles including an amorphous polyester resin are dispersed, a resin particle dispersion liquid in which the resin particles including a crystalline polyester resin are dispersed, and a resin particle dispersion liquid in which the resin particles including a vinyl resin are dispersed may be prepared individually.

The amorphous polyester resin, crystalline polyester resin, and vinyl resin included in the above resin particle dispersion liquids are the same as the amorphous polyester resin, crystalline polyester resin, and vinyl resin described below in the description of the binder resin included in the toner particles.

The volume average size of the resin particles is preferably, for example, 0.01 μm or more and 1 μm or less, is more preferably 0.04 μm or more and 0.8 μm or less, and is further preferably 0.06 μm or more and 0.6 μm or less.

The volume average diameter of the resin particles is determined in the following manner. The particle diameter distribution of the resin particles is obtained using a laser-diffraction particle-size-distribution measurement apparatus, such as "LA-700" produced by HORIBA, Ltd. The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 50% is considered to be the volume particle diameter D50v. The volume average diameters of particles included in the other dispersion liquids are also determined in the above-described manner.

Examples of the dispersion medium used for preparing the resin particle dispersion liquid include aqueous media.

Examples of the aqueous media include water, such as distilled water and ion-exchange water; and alcohols. These aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, in particular, the anionic surfactants and the cationic surfactants may be used. The nonionic surfactants may be used in combination with the anionic surfactants and the cationic surfactants.

These surfactants may be used alone or in combination of two or more.

The content of the resin particles in the resin particle dispersion liquids is preferably, for example, 5% by mass or more and 50% by mass or less and is more preferably 10% by mass or more and 40% by mass or less.

Example of the method for preparing the resin particle dispersion liquids include a method in which a solution including the resin particles and the dispersion medium is dispersed with, for example, a rotary-shearing homogenizer or a ball mill, a sand mill, or a dyno mill that includes media.

Examples of the method for preparing the resin particle dispersion liquids also include a method in which the resin particles are dispersed in the resin particle dispersion liquid by, for example, phase-inversion emulsification.

Phase-inversion emulsification is a method in which the resin to be dispersed is dissolved in a hydrophobic organic solvent in which the resin is soluble, a base is added to the resulting organic continuous phase (i.e., O phase) to perform neutralization, and subsequently an aqueous medium (i.e., W phase) is charged in order to perform conversion of resin (i.e., phase inversion) from W/O to O/W, form a discontinuous phase, and disperse the resin in the aqueous medium in the form of particles.

Colorant Particle Dispersion Liquid

The colorant particle dispersion liquid includes particles including a colorant and a dispersion medium and may optionally include a surfactant.

The colorant included in the colorant particle dispersion liquid is the same as the colorant included in the toner particles described below. That is, the same colorant as that included in the toner particles is used.

The dispersion medium and surfactant included in the colorant particle dispersion liquid may be the same as the dispersion medium and surfactant included in the resin particle dispersion liquids described above.

Example of the method for preparing the colorant particle dispersion liquid include a method in which a solution including the colorant, the dispersion medium, and the surfactant is dispersed with, for example, a rotary-shearing homogenizer or a ball mill, a sand mill, or a dyno mill that includes media.

Release Agent Particle Dispersion Liquid

The release agent particle dispersion liquid includes particles including a release agent and a dispersion medium and may optionally include a surfactant.

The release agent included in the release agent particle dispersion liquid is the same as the release agent included in the toner particles described below. That is, the same release agent as that included in the toner particles is used.

The dispersion medium and surfactant included in the release agent particle dispersion liquid may be the same as the dispersion medium and surfactant included in the resin particle dispersion liquids described above.

Example of the method for preparing the release agent particle dispersion liquid include a method in which a solution including the release agent, the dispersion medium, and the surfactant is heated to bring the release agent into a molten state and dispersion is subsequently performed with, for example, a rotary-shearing homogenizer or a ball mill, a sand mill, or a dyno mill that includes media.

Aggregated Particle Formation Step

The resin particle dispersion liquids are mixed with the colorant particle dispersion liquid and the release agent particle dispersion liquid to form a mixed dispersion liquid.

In the mixed dispersion liquid, heteroaggregation of the resin particles with the colorant particles and the release agent particles is performed in order to form aggregated particles including the resin particles, the colorant particles, and the release agent particles, the aggregated particles having a diameter close to that of the intended toner particles.

Specifically, for example, a flocculant is added to the mixed dispersion liquid, and the pH of the mixed dispersion liquid is controlled to be acidic (e.g., pH of 2 or more and 5 or less). A dispersion stabilizer may be added to the mixed dispersion liquid as needed. Subsequently, the mixed dispersion liquid is heated to the glass transition temperature of the resin particles (specifically, e.g., [Glass transition temperature of the resin particles−30° C.] or more and [the Glass transition temperature−10° C.] or less), and thereby the particles dispersed in the mixed dispersion liquid are caused to aggregate together to form aggregated particles.

In the aggregated particle formation step, alternatively, for example, the above flocculant may be added to the mixed dispersion liquid at room temperature (e.g., 25° C.) while the mixed dispersion liquid is stirred using a rotary-shearing homogenizer. Then, the pH of the mixed dispersion liquid is controlled to be acidic (e.g., pH of 2 or more and 5 or less), and a dispersion stabilizer may be added to the mixed dispersion liquid as needed. Subsequently, the mixed dispersion liquid is heated in the above-described manner.

Examples of the flocculant include surfactants, inorganic metal salts, and divalent or higher metal complexes that have a polarity opposite to that of the surfactant included in the mixed dispersion liquid as a dispersant. In particular, using a metal complex as a flocculant reduces the amount of surfactant used and, as a result, charging characteristics may be enhanced.

An additive capable of forming a complex or a bond similar to a complex with the metal ions contained in the flocculant may optionally be used. An example of the additive is a chelating agent.

Examples of the inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelating agent may be a water-soluble chelating agent. Examples of such a chelating agent include oxycarboxylic acids, such as tartaric acid, citric acid, and gluconic acid; and iminodiacetic acid (IDA), nitrilotriacetic acid (NTA), and ethylenediaminetetraacetic acid (EDTA).

The amount of the chelating agent used is, for example, preferably 0.01 parts by mass or more and 5.0 parts by mass or less and is more preferably 0.1 parts by mass or more and less than 3.0 parts by mass relative to 100 parts by mass of the resin particles.

Fusion Coalescence Step

An aggregated particle dispersion liquid in which the aggregated particles are dispersed is heated to, for example, a temperature equal to or higher than the glass transition temperature of the resin particles (e.g., [Glass transition temperature of the resin particles+10° C.] or more and [the Glass transition temperature+30° C.] or less) in order to perform fusion and coalescence of the aggregated particles. Hereby, toner particles are formed.

Step 2

The step 2 is a step of bringing acidic water into contact with the toner particles.

The acidic water is an aqueous solution including an acid.

In order to further reduce the amount of sodium ions that remain on the surfaces of the toner particles, the pKa of the acid in water at 25° C. is preferably −10 or more and 4.5 or less, is more preferably −10 or more and 2 or less, and is further preferably −10 or more and 0 or less.

The acid may be a monovalent acid.

A monovalent acid is an acid capable of dissociating into one proton and a monovalent counteranion in an aqueous solution.

When the acidic water is brought into contact with the toner particles, the counteranion may remain on the surfaces of the toner particles. When the counteranion remains on the surfaces of the toner particles, the toner particles are likely to capture the moisture included in the air. When the toner particles capture the moisture, the surfaces of the toner particles become soft. In such a case, for example, when an image having a low area coverage is continuously formed in a high temperature-high humidity environment, the likelihood of external additive particles being buried in the surfaces of the toner particles is increased and the likelihood of the toner particles being bonded to one another is increased. If the toner particles are bonded to one another, the occurrence of image defects, such as colored streaks or colored spots, is increased. The higher the valence of the counteranion, the higher the likelihood of the toner particles capturing the moisture included in the air when the counteranion remains on the surfaces of the toner particles. Therefore, using a monovalent acid as an acid reduces the likelihood of the toner particles capturing the moisture included in the air compared with the case where a divalent or higher acid is used. This may reduce the occurrence of image defects, such as colored streaks or colored spots.

Examples of the acid include an inorganic acid and an organic acid.

The inorganic acid is an acid that does not include a carbon atom, while the organic acid is an acid that includes a carbon atom.

Examples of the inorganic acid include hydrochloric acid, sulfuric acid, nitric acid, phosphoric acid, hydroiodic acid, hydrobromic acid, chloric acid, bromic acid, iodic acid, permanganic acid, thiocyanic acid, perchloric acid, perbromic acid, tetrafluoroboric acid, and hexafluorophosphoric acid.

In order to reduce the likelihood of the toner particles capturing the moisture included in the air, the inorganic acid may be at least one selected from the group consisting of hydrochloric acid, sulfuric acid, and nitric acid.

Examples of the organic acid include citric acid, acetic acid, benzoic acid, salicylic acid, and p-toluenesulfonic acid.

The acid may be nitric acid.

In other words, the acidic water may be an aqueous nitric acid solution.

Since nitric acid is a monovalent acid, the likelihood of the toner particles capturing the moisture included in the air when the counteranion remains on the surfaces of the toner particles is low. In addition, since nitric acid has higher ionization tendency than other anions, it is considered that ion exchange occurs in the water with efficiency. As a result, a toner that reduces the occurrence of colored streaks or colored spots may be produced further readily.

The acidic water may be acidic water having an acid concentration (i.e., the number of moles of an acid included in 1 L of acidic water) of 0.5 mmol/L or more and 8 mmol/L or less.

When the above acid concentration is 0.5 mmol/L or more, the sodium ions that remain on the surfaces of the toner particles may be ion-exchanged into protons with further efficiency when the acidic water is brought into contact with the toner particles.

Limiting the above acid concentration to be 8 mmol/L or less makes it easy to reduce the amount of counteranions that result from the acid and remain on the surfaces of the toner particles.

In order to make it easier to produce a toner that may reduce the occurrence of colored streaks or colored spots, the acid concentration in the acidic water is more preferably 1.0 mmol/L or more and 6 mmol/L or less and is further preferably 1.5 mmol/L or more and 4 mmol/L or less.

The temperature of the acidic water having an acid concentration of 0.5 mmol/L or more and 8 mmol/L or less (hereinafter, such an acidic water is referred to also as "specific acidic water") may be 35° C. or less.

In order to increase the efficiency of ion exchange, the amount of protons released from the acid may be maximized. In order to increase the amount of protons released from the acid, the temperature of the acidic water may be maximized. However, if the temperature of the acidic water is excessively high, the acidic water may cause fusion of the toner particles when brought into contact with the toner particles and, consequently, coarse particles are likely to be formed.

Setting the upper limit for the temperature of the specific acidic water to 35° C. may reduce the fusion of the toner particles which may occur when the acidic water is brought into contact with the toner particles while increasing the efficiency of ion exchange.

In order to increase the efficiency of ion exchange and reduce the fusion of the toner particles which may occur when the acidic water is brought into contact with the toner particles, the temperature of the specific acidic water is preferably 15° C. or more and 35° C. or less, is more preferably 20° C. or more and 33° C. or less, and is further preferably 25° C. or more and 31° C. or less.

The temperature of the acidic water is measured with a contact thermometer.

Examples of the contact thermometer that can be used include "Thermowell (PFA coating)" produced by Okazaki Manufacturing Company.

The drop from the Na content in the surfaces of the toner particles that have not been subjected to the step 2 (Na $content_{Befor}$) to the Na content in the surfaces of the toner particles that have been subjected to the step 2 (Na $content_{After}$) may be 0.10 mg/L or more and 2.0 mg/L or less, and the Na content in the surfaces of the toner particles that have been subjected to the step 2 (Na $content_{After}$) may be 0.05 mg/L or more and 0.4 mg/L or less.

Limiting the Na content in the surfaces of the toner particles that have been subjected to the step 2 (Na $content_{After}$) to 0.05 mg/L or more prevents the amount of the sodium ions that remain on the surfaces of the toner particles from being excessively small. This reduces the likelihood of the surfaces of the toner particles being hydrophobized to an excessive degree and consequently reduces the likelihood of the surface hardness of crystal portions included in the surfaces of the toner particles being relatively increased. Therefore, for example, in the case where an image having a low area coverage is formed under low temperature low humidity conditions, external additive particles are unlikely to be unevenly distributed in portions of the surfaces of the toner particles which are other than the crystal portions. This reduces the aggregation of the toner particles and makes it easy to produce a toner that may reduce the occurrence of colored streaks or colored spots. Limiting the Na content in the surfaces of the toner particles that have been subjected to the step 2 (Na $content_{After}$) to 0.4 mg/L or less reduces the amount of the sodium ions that remain on the surfaces of the toner particles and enables the production of a toner that may reduce the occurrence of colored streaks or colored spots.

Limiting the drop from the Na content in the surfaces of the toner particles that have not been subjected to the step 2 (Na $content_{Befor}$) to the Na content in the surfaces of the toner particles that have been subjected to the step 2 (Na $content_{After}$) to 2.0 mg/L or less prevents the amount of the acidic water used in the step 2 from being excessively large. Therefore, the surfactant adsorbed on the surfaces of the toner particles can remain in an adequate amount, and the toner particles repel one another at an adequate degree. This reduces the aggregation of the toner particles and the formation of coarse particles.

Limiting the drop from the Na content in the surfaces of the toner particles that have not been subjected to the step 2 (Na $content_{Befor}$) to the Na content in the surfaces of the toner particles that have been subjected to the step 2 (Na $content_{After}$) to 0.10 mg/L or more makes it easy to set the Na content in the surfaces of the toner particles that have been subjected to the step 2 (Na $content_{After}$) to fall within the range of 0.05 mg/L or more and 0.4 mg/L or less in the case where, for example, the Na content in the surfaces of the toner particles that have not been subjected to the step 2 (Na $content_{Befor}$) is 0.5 mg/L or more.

In order to further reduce the formation of coarse particles, the drop from the Na $content_{Befor}$ to the Na $content_{After}$ is more preferably 0.50 mg/L or more and 1.8 mg/L or less and is further preferably 0.80 mg/L or more and 1.5 mg/L or less.

In order to produce a toner that may reduce the occurrence of colored streaks or colored spots, the Na $content_{After}$ is more preferably 0.08 mg/L or more and 0.38 mg/L or less and is further preferably 0.10 mg/L or more and 0.35 mg/L or less.

The procedure for the measurement of the Na $content_{Befor}$ is described below.

The procedure for the measurement of the Na $content_{Befor}$ consists of (1) preparation of calibration curve and (2) calculation of Na $content_{Befor}$ using the calibration curve.

(1) Preparation of Calibration Curve

The preparation of the calibration curve consists of "Collection of Measurement Samples", "Measurement of Na Content in Surfaces of Toner Particles", "Measurement of Electric Conductivity of Filtrates", and "Data Plotting".

Collection of Measurement Samples

A part (100 g, in terms of the amount of toner particles) of the dispersion liquid containing the toner particles that have not been subjected to the step 2 is charged into a stainless steel tank holder "KST-90" produced by Advantech Co., Ltd. which is equipped with a filter paper (hereinafter, this device is also referred to simply as "device"), such that the device includes 100 g of the toner particles. Subsequently, pressure filtration is performed at 0.4 MPa. Upon the flow of the filtrate being stopped, the pressure filtration is stopped, the resulting cake (this cake is also referred to as "initial cake") is taken, and the filtrate is collected (the collected filtrate is referred to as "filtrate 1"). From the cake, 1 g of a toner particle sample is taken such that the shape of the cake does not become deformed. The toner particle sample is dried with an exhauster. The dried toner particle sample is defined as "toner particle sample A".

Then, an amount of ion-exchange water which is 100% by mass of the mass (i.e., the mass (g) of the cake−1 g) of the residual toner is charged to the device. Subsequently, pressure filtration is performed at 0.4 MPa, and the filtrate is collected (the collected filtrate is defined as "filtrate 2"). Upon the flow of the filtrate being stopped, the pressure filtration is stopped. From the resulting cake, 1 g of a toner particle sample is taken such that the shape of the cake does not become deformed. The toner particle sample is dried with an exhauster. The dried toner particle sample is defined as "toner particle sample B".

The same operation as describe above is repeatedly conducted until the total amount of the ion-exchange water charged reaches 2,000% by mass of the mass of the initial cake, while the toner particle samples (specifically, the toner particle sample A, the toner particle sample B, etc. which are numbered consecutively in the order collected) and the filtrates (specifically, the filtrate 1, the filtrate 2, etc. which are numbered consecutively in the order collected) are collected.

Measurement of Na Content in Surfaces of Toner Particles

Using each of the toner particle samples (i.e., the toner particle sample A, the toner particle sample B, etc. numbered consecutively), the Na content in the surfaces of the toner particles is measured by ion chromatography.

Specifically, 0.5 g of the toner particle sample is weighed. The toner particle sample is dispersed in 100 g of ion-exchange water to which 0.1 g (20% of the amount of the toner particles) of a nonionic surfactant "Nonipol 10" produced by Sanyo Chemical Industries, Ltd. has been added. The resulting dispersion liquid is dispersed for 30 minutes with an ultrasonic disperser in a thermostat kept at 30° C.±1° C.

The liquid that has been subjected to the ultrasonic dispersion is subjected to solid-liquid separation by suction filtration in order to remove solid toner particles. The resulting filtrate is used as a measurement sample. The above measurement sample is prepared for each of the toner particle samples.

Furthermore, a blank sample that does not include the toner particles is prepared.

Subsequently, the Na contents in the measurement sample and the blank sample are measured by ion chromatography. In the ion chromatography, an analysis is conducted with "ICS-2000" produced by Nippon Dionex K.K. under the following conditions.

Cation separation column: "IonPacCS12A" produced by Nippon Dionex K.K.

Cation guard column: "IonPacCG12A" produced by Nippon Dionex K.K.

Eluent: Methanesulfonic acid, 20 mM (mmol/L)

Flow rate: 1 mL/min

Temperature: 35° C.

Detection method: Suppressed conductivity detection

The Na content (mg/L) in the surfaces of the toner particles is calculated on the basis of the Na contents measured above.

The Na content (mg/L) in the surfaces of the toner particles is determined by subtracting the Na content (mg/L) in the blank sample from the Na content (mg/L) in the measurement sample.

Measurement of Electric Conductivities of Filtrates

The electric conductivity (S/m) of each of the filtrates collected (specifically, the filtrate 1, the filtrate 2, etc. numbered consecutively) is measured.

Data Plotting

In a graph with the x-axis representing electric conductivity (S/m) and the y-axis representing the Na content (mg/L) in the surfaces of the toner particles, the electric conductivities of the filtrates and the Na contents in the surfaces of the toner particle samples are plotted. Specifically, (x, y)=(electric conductivity of filtrate 1, Na content in surfaces of toner particle sample A), (electric conductivity of filtrate 2, Na content in surfaces of toner particle sample B), etc. are plotted, and an approximate straight line is drawn on the basis of the plots by a least-square method. This approximate straight line is used as a calibration curve.

(2) Calculation of Na Content$_{Befor}$ Using Calibration Curve

After the wash water A has been brought into contact with the toner particles in the step 1.5 described below, filtration is performed and 50 mL of filtrate produced immediately before the end of the filtration is collected. The electric conductivity of the filtrate is measured, and the Na content$_{Befor}$ is determined on the basis of the measured electric conductivity and the calibration curve prepared above.

In the case where the amounts of the raw materials used are changed, the calibration curve is newly prepared.

The procedure for the measurement of the Na content$_{After}$ is described below.

The procedure for the measurement of the Na content$_{After}$ consists of (1) preparation of calibration curve and (2) calculation of Na content$_{After}$ using the calibration curve.

(1) Preparation of Calibration Curve

The preparation of the calibration curve consists of "Collection of Measurement Samples", "Measurement of Na Content in Surfaces of Toner Particles", "Measurement of Electric Conductivity of Filtrates", and "Data Plotting".

Collection of Measurement Samples

The same operation as in "Collection of Measurement Samples" in "(1) Preparation of Calibration Curve" included in the procedure for the measurement of the Na content$_{Befor}$ is performed four times using different devices. Hereby, in total, four devices each including a cake are prepared.

Into one of the devices including a cake, an amount of ion-exchange water which is 200% by mass of the mass of the cake is charged, and pressure filtration is subsequently performed. This device is defined as "device A".

Into another device including a cake, an amount of ion-exchange water which is 300% by mass of the mass of the cake is charged, and pressure filtration is subsequently performed. This device is defined as "device B".

Into still another device including a cake, an amount of ion-exchange water which is 600% by mass of the mass of the cake is charged, and pressure filtration is subsequently performed. This device is defined as "device C".

Into the other device including a cake, ion-exchange water is not charged. This device is defined as "device D".

For each of the devices A to D, the following operation is conducted.

An amount of the acidic water used in the step 2 (the type of the acid included in the acidic water, the acid concentration in the acidic water, and the temperature of the acidic water are the same as those of the acidic water used in the step 2) which is 100% by mass of the mass of the cake included in the device (this cake is also referred to as "initial cake 2") is charged into the device. Subsequently, pressure filtration is performed at 0.4 MPa, and the filtrate is collected (the collected filtrate is defined as "filtrate 2-1"). Upon the flow of the filtrate being stopped, the pressure filtration is stopped. From the resulting cake, 1 g of a toner particle sample is taken such that the shape of the cake does not become deformed. The toner particle sample is dried with an exhauster. The dried toner particle sample is defined as "toner particle sample 2-A".

While the toner particle samples (specifically, the toner particle sample 2-A, the toner particle sample 2-B, etc. which are numbered consecutively in the order collected) and the filtrates (specifically, the filtrate 2-1, the filtrate 2-2, etc. which are numbered consecutively in the order collected) are collected, the same operation as described above is repeatedly conducted. Thus, pressure filtration is performed while an amount of acidic water which is in total 2,000% by mass of the mass of the initial cake 2 is added to the device.

Measurement of Na Content in Surfaces of Toner Particles

The Na content (mg/L) in the surfaces of each of the toner particle samples (i.e., the toner particle sample 2-A, the toner particle sample 2-B, etc. numbered consecutively) is measured. The measuring method used is the same as the method described in "Measurement of Na Content in Surfaces of Toner Particles" of "(1) Preparation of Calibration Curve" included in the procedure for the measurement of the Na content$_{Befor}$.

Measurement of Electric Conductivities of Filtrates

The electric conductivity (S/m) of each of the filtrates collected (specifically, the filtrate 2-1, the filtrate 2-2, etc. numbered consecutively) is measured.

The measuring method used is the same as the method described in "Measurement of Electric Conductivities of Filtrates" of "(1) Preparation of Calibration Curve" included in the procedure for the measurement of the Na content$_{Befor}$.

Data Plotting

In a graph with the x-axis representing electric conductivity (S/m) and the y-axis representing the Na content (mg/L) in the surfaces of the toner particles, the electric conductivities of the filtrates and the Na contents in the surfaces of toner particle samples are plotted. Specifically, (x, y)=(electric conductivity of filtrate 2-1, Na content in surfaces of toner particles 2-A), (electric conductivity of filtrate 2-2, Na content in surfaces of toner particles 2-B), etc. are plotted, and an approximate straight line is drawn on the basis of the plots by a least-square method. This approximate straight line is used as a calibration curve.

In the above-described procedure, in total four calibration curves, which are determined using the devices A to D, are prepared.

In the case where the amounts of the raw materials added are changed or the concentration of the acid is changed, the calibration curves are newly prepared at the predetermined acid concentrations. The calibration curves are also newly prepared when the temperature of the acid is changed.

(2) Calculation of Na Content$_{After}$ Using Calibration Curve

After the acidic water has been brought into contact with the toner particles in the step 2, filtration is performed and 50 mL of filtrate produced immediately before the end of the filtration is collected. The electric conductivity of the filtrate is measured, and the Na content$_{After}$ is determined on the basis of the measured electric conductivity and the calibration curve prepared above.

The calibration curve used for calculating the Na content$_{After}$ is selected in the following manner.

The calibration curve is selected such that the amount (% by mass) of the ion-exchange water charged to the device used for preparing the calibration curve in the preparation of the devices A to D relative to the mass of the cake is closest to the amount (% by mass) of the wash water A added in the step 1.5 described below relative to the total mass of the toner particles.

Specifically, in the case where 600% by mass of wash water A relative to the total mass of the toner particles is added in the step 1.5 described below, the calibration curve determined using the device C is selected.

The method for bringing the acidic water into contact with the toner particles is not limited.

For example, the acidic water is added to the toner particles to form a slurry and the slurry is stirred (re-slurry method).

Alternatively, the toner particles are charged into filter chambers of a filter press and compressed to form a cake layer made of the toner particles, and the acidic water is passed through the cake layer (filter press method).

In order to further reduce the amount of the sodium ions that remain on the surfaces of the toner particles, a filter press method may be used for bringing the acidic water into contact with the toner particles.

The filter press may be a horizontal filter press (i.e., a filter press that performs compression by applying a force in the horizontal direction) or a vertical filter press (i.e., a filter press that performs compression by applying a force in a direction perpendicular to the horizontal direction).

Step 1.5

Prior to the step 2, a step of bringing the wash water A into contact with the toner particles (hereinafter, this step is referred to also as "step 1.5") may be conducted.

Bringing the wash water A into contact with the toner particles prior to the step 2 reduces the content of sodium ions in the surfaces of the toner particles that have not been brought into contact with the acidic water compared with the case where the toner particles are not brought into contact with the wash water A. This prevents the amount of the acidic water used in the step 2 from being excessively large. Consequently, the surfactant adsorbed on the surfaces of the toner particles remains in an adequate amount, and the toner particles repel one another at an adequate degree. This reduces the aggregation of the toner particles and the formation of coarse particles. When the formation of coarse particles is reduced, the occurrence of image defects, such as colored streaks or colored spots, may be reduced.

The wash water A may be water.

The type of water is not limited, and ion-exchange water, ultrapure water, distilled water, ultrafiltration water, and the like may be used. In order to reduce the amount of ions that remain on the surfaces of the toner particles, at least one of ion-exchange water and ultrapure water may be used.

The mass of the wash water A is preferably 150% by mass or more and 2,000% by mass or less, is more preferably 200% by mass or more and 1, 500% by mass or less, and is further preferably 250% by mass or more and 1,000% by mass or less of the total mass of the toner particles.

Limiting the mass of the wash water A to 150% by mass or more of the total mass of the toner particles may further reduce the content of sodium ions in the surfaces of the toner particles that have not been brought into contact with the acidic water.

The upper limit for the ratio of the mass of the wash water A to the total mass of the toner particles is not set and may be 2,000% by mass or less in order to reduce the amount of time required by the step 1.5.

The method for bringing the wash water A into contact with the toner particles is not limited. For example, the wash water A is added to the toner particles to form a slurry and the slurry is stirred (re-slurry method).

Alternatively, the toner particles are charged into filter chambers of a filter press and compressed to form a cake layer made of the toner particles, and the wash water A is passed through the cake layer (filter press method).

Step 3

Subsequent to the step 2, a step of bringing wash water B into contact with the toner particles may be conducted (hereinafter, this step is referred to also as "step 3").

The wash water B may be water.

Specific examples of the water are the same as those of the wash water A described above.

As described above, if the amount of counteranions that result from the acid included in the acidic water added in the step 2 remain on the surfaces of the toner particles in a large amount, the likelihood of the toner particles capturing the moisture included in the air is increased. In such a case, the aggregation of the toner particles occurs and the occurrence of image defects, such as colored streaks or colored spots, may be increased.

Conducting the step 3 reduces the amount of the counteranions that remain on the surfaces of the toner particles and may further reduce the occurrence of image defects, such as colored streaks or colored spots.

In order to produce a toner that may further reduce the occurrence of image defects, such as colored streaks or colored spots, the mass of the wash water B is preferably 100% by mass or more and 2,000% by mass or less, is more preferably 200% by mass or more and 1, 500% by mass or less, and is further preferably 300% by mass or more and 1,000% by mass or less of the total mass of the toner particles.

The method for bringing the wash water B into contact with the toner particles may be selected from the methods described above as an example of the method for bringing the wash water A into contact with the toner particles.

In the step 3 in which, subsequent to the step 2, the wash water B is brought into contact with the toner particles, the rise from the anion content in the surfaces of the toner particles that have not been subjected to the step 2 (anion $\text{content}_{Befor}$) to the anion content in the surfaces of the toner particles that have been subjected to the step 2 (anion $\text{content}_{After2}$) may be 1 mg/L or more and 5 mg/L or less, and the anion content in the surfaces of the toner particles that have been subjected to the step 3 (anion $\text{content}_{After3}$) may be 0.001 mg/L or more and 0.1 mg/L or less.

Limiting the rise from the anion $\text{content}_{Befor}$ to the anion $\text{content}_{After2}$ to 1 mg/L or more and 5 mg/L or less prevents the amount of counteranions that result from the acid and remain on the surfaces of the toner particles from being excessively large. This makes it easier to reduce the amount of counteranions that result from the acid and remain on the surfaces of the toner particles by bringing the wash water B into contact with the toner particles in the step 3 and consequently reduces the occurrence of image defects, such as colored streaks or colored spots.

Limiting the anion $\text{content}_{After3}$ to 0.001 mg/L or more and 0.1 mg/L or less reduces the amount of counteranions that result from the acid and remain on the surfaces of the toner particles and enables the production of a toner that may reduce the occurrence of colored streaks or colored spots.

The rise from the anion $\text{content}_{Befor}$ to the anion $\text{content}_{After2}$ is more preferably 1 mg/L or more and 3 mg/L or less and is further preferably 1 mg/L or more and 2 mg/L or less.

The anion $\text{content}_{After3}$ is more preferably 0.01 mg/L or more and 0.08 mg/L or less and is further preferably 0.02 mg/L or more and 0.05 mg/L or less.

The procedure for the measurement of the anion content$_{Befor}$ is described below.

The procedure for the measurement of the anion content$_{Befor}$ consists of (1) preparation of calibration curve and (2) calculation of anion content$_{Befor}$ using the calibration curve.

(1) Preparation of Calibration Curve

The preparation of the calibration curve consists of "Collection of Measurement Samples", "Measurement of Anion Content in Surfaces of Toner Particles", "Measurement of Electric Conductivity of Filtrates", and "Data Plotting".

Collection of Measurement Samples

The same operation as in "Collection of Measurement Samples" in "(1) Preparation of Calibration Curve" included in the procedure for the measurement of the Na content$_{Befor}$ is performed.

Measurement of Anion Content in Surfaces of Toner Particles

The same operation as in "Measurement of Na Content in Surfaces of Toner Particles" of "(1) Preparation of Calibration Curve" included in the procedure for the measurement of the Na content$_{Befor}$ is performed, except that the conditions under which ion chromatography is performed are changed as follows and the measurement item is changed from "Na content" to "anion content (specifically, the total content of a nitrate ion, a sulfate ion, a chloride ion, and a nitrite ion; the same applies hereinafter)".

Anion separation column: "Dionex IonPac AS18" produced by Thermo Fisher Scientific Anion guard column: "Dionex IonPac ATC-HC600" produced by Thermo Fisher Scientific Eluent: Aqueous potassium hydroxide solution 40 mM (mmol/L)

Flow rate: 1 mL/min

Temperature: 35° C.

Detection method: Suppressed conductivity detection

Measurement of Electric Conductivities of Filtrates

The same operation as in "Measurement of Electric Conductivities of Filtrates" of "(1) Preparation of Calibration Curve" included in the procedure for the measurement of the Na content$_{Befor}$. is conducted.

Data Plotting

In a graph with the x-axis representing electric conductivity (S/m) and the y-axis representing the anion content (mg/L) in the surfaces of the toner particles, the electric conductivities of the filtrates and the anion contents in the surfaces of toner particle samples are plotted. Specifically, (x, y)=(electric conductivity of filtrate 1, anion content in surfaces of toner particle sample A), (electric conductivity of filtrate 2, anion content in surfaces of toner particle sample B), etc. are plotted, and an approximate straight line is drawn on the basis of the plots by a least-square method. This approximate straight line is used as a calibration curve.

(2) Calculation of Anion Content$_{Befor}$ Using Calibration Curve

After the wash water A has been brought into contact with the toner particles in the step 1.5 described above, filtration is performed and 50 mL of filtrate produced immediately before the end of the filtration is collected. The electric conductivity of the filtrate is measured, and the anion content$_{Befor}$ is determined on the basis of the measured electric conductivity and the calibration curve prepared above.

The procedure for the measurement of the anion content$_{After2}$ is described below.

The procedure for the measurement of the anion content$_{After2}$ consists of (1) preparation of calibration curve and (2) calculation of anion content$_{After2}$ using the calibration curve.

(1) Preparation of Calibration Curve

The preparation of the calibration curve consists of "Collection of Measurement Samples", "Measurement of Anion Content in Surfaces of Toner Particles", "Measurement of Electric Conductivity of Filtrates", and "Data Plotting".

Collection of Measurement Samples

The same operation as in "Collection of Measurement Samples" in "(1) Preparation of Calibration Curve" included in the procedure for the measurement of the Na content$_{After}$ is performed.

Measurement of Anion Content in Surfaces of Toner Particles

The same operation as in "Measurement of Na Content in Surfaces of Toner Particles" of "(1) Preparation of Calibration Curve" included in the procedure for the measurement of the Na content$_{After}$ is performed, except that the conditions under which ion chromatography is performed are changed to the same conditions as in "Measurement of Anion Content in Surfaces of Toner Particles" of "(1) Preparation of Calibration Curve" included in the procedure for the measurement of the anion content$_{Befor}$ and the measurement item is changed from "Na content" to "anion content".

Measurement of Electric Conductivities of Filtrates

The same operation as in "Measurement of Electric Conductivities of Filtrates" of "(1) Preparation of Calibration Curve" included in the procedure for the measurement of the Na content$_{After}$ is performed.

Data Plotting

In a graph with the x-axis representing electric conductivity (S/m) and the y-axis representing the anion content (mg/L) in the surfaces of the toner particles, the electric conductivities of the filtrates and the anion contents in the surfaces of toner particle samples are plotted. Specifically, (x, y)=(electric conductivity of filtrate 2-1, anion content in surfaces of toner particle sample 2-A), (electric conductivity of filtrate 2-2, anion content in surfaces of toner particle sample 2-B), etc. are plotted, and an approximate straight line is drawn on the basis of the plots by a least-square method. This approximate straight line is used as a calibration curve.

(2) Calculation of Anion Content$_{After2}$ Using Calibration Curve

After the acidic water has been brought into contact with the toner particles in the step 2, filtration is performed and 50 mL of filtrate produced immediately before the end of the filtration is collected. The electric conductivity of the filtrate is measured, and the anion content$_{After2}$ is determined on the basis of the measured electric conductivity and the calibration curve prepared above.

The calibration curve used for calculating the anion content$_{After2}$ is selected as described in "(2) Calculation of Na Content$_{After}$ Using Calibration Curve".

The procedure for the measurement of the anion content$_{After3}$ is described below.

Using the toner particles that have been subjected to the step 3, the anion content in the surfaces of the toner particles is measured by ion chromatography.

Specifically, 0.5 g of the toner particles that have been subjected to the step 3 is weighed. The toner particle sample is dispersed in 100 g of ion-exchange water to which 0.1 g (20% of the amount of the toner particles) of a nonionic surfactant "Nonipol 10" produced by Sanyo Chemical Industries, Ltd. has been added. The resulting dispersion liquid is dispersed for 30 minutes with an ultrasonic disperser in a thermostat kept at 30° C.±1° C.

The liquid that has been subjected to the ultrasonic dispersion is subjected to solid-liquid separation by suction filtration in order to remove solid toner particles. The resulting filtrate is used as a measurement sample.

Furthermore, a blank sample that does not include the toner particles is prepared.

Subsequently, the anion contents in the measurement sample and the blank sample are measured by ion chromatography. In the ion chromatography, an analysis is conducted with "ICS-2000" produced by Nippon Dionex K. K. The measurement conditions are the same as in "Measurement of Anion Content in Surfaces of Toner Particles" of "(1) Preparation of Calibration Curve" included in the procedure for the measurement of the anion content$_{Befor}$.

The anion content$_{After3}$ (mg/L) is calculated on the basis of the above anion contents.

The anion content$_{After3}$ (mg/L) is determined by subtracting the anion content (mg/L) in the blank sample from the anion content (mg/L) in the measurement sample.

Other Steps

The method for producing a toner according to this exemplary embodiment may include steps other than the step 1, the step 1.5, the step 2, or the step 3.

Examples of the other steps include a sieving step.

Examples of the sieving step include a step of passing a suspended solution (slurry) including the toner particles through a screen or the like to remove coarse particles included in the suspended solution.

The size of openings of the screen is adjusted appropriately in accordance with the size of the toner particles. For example, the ratio of the size (units: μm) of the openings to the volume average particle size D50v (units: μm) of the toner particles [Opening/D50v] is preferably 2 or more and 6 or less and is more preferably 3 or more and 5 or less.

Examples of the other steps also include publicly known solid-liquid separation step and drying step.

The solid-liquid separation step is not limited. Suction filtration, pressure filtration, and the like may be performed in consideration of productivity. The drying step is also not limited. Freeze drying, flash drying, fluidized drying, vibro-fluidized drying, and the like may be performed in consideration of productivity.

The toner according to this exemplary embodiment is produced by, for example, adding an external additive to the dried toner particles and stirring the resulting mixture. The above stirring may be performed using a V-blender, a Henschel mixer, a Lodige mixer, or the like. Furthermore, as needed, coarse toner particles may be removed with a vibration sieving machine, an air sieving machine, or the like.

Mass of Crystalline Polyester Resin Included in Toner Particles

The mass of the crystalline polyester resin included in the toner particles is preferably 10% by mass or more and 30% by mass or less, is more preferably 10% by mass or more and 25% by mass or less, and is further preferably 12% by mass or more and 20% by mass or less of the total mass of the toner particles.

Limiting the ratio of the mass of the crystalline polyester resin included in the toner particles to the total mass of the toner particles to 30% by mass or less prevents the hydrophobicity of the surfaces of the toner particles from being excessively high and reduces the adsorption of a surfactant onto the surfaces of the toner particles. Therefore, even when a surfactant including a sodium ion is used, the amount of the sodium ions that remain on the surfaces of the toner particles is further likely to be small.

Electrostatic Image Developing Toner

A toner produced by the production method according to the above-described exemplary embodiment includes toner particles and, as needed, an external additive.

Toner Particles

The toner particles include a binder resin and, as needed, a colorant, a release agent, and other additives.

Binder Resin

The binder resin includes an amorphous polyester resin, a crystalline polyester resin, and a vinyl resin.

The term "crystalline resin" used herein refers to a resin that exhibits a distinct endothermic peak instead of a step-like endothermic change in differential scanning calorimetry (DSC) and, specifically, a resin that exhibits an endothermic peak with a half-width of 10° C. or less at a heating rate of 10° C./min.

On the other hand, the term "amorphous resin" used herein refers to a resin the half-width of which is more than 10° C., a resin that exhibits a step-like endothermic change, or a resin that does not exhibit a distinct endothermic peak.

Amorphous Polyester Resin

Examples of the amorphous polyester resin include condensation polymers of a polyvalent carboxylic acid and a polyhydric alcohol. The amorphous polyester resin may be a commercially available one or a synthesized one.

Examples of the polyvalent carboxylic acid include aliphatic dicarboxylic acids, such as oxalic acid, malonic acid, maleic acid, fumaric acid, citraconic acid, itaconic acid, glutaconic acid, succinic acid, alkenyl succinic acid, adipic acid, and sebacic acid; alicyclic dicarboxylic acids, such as cyclohexanedicarboxylic acid; aromatic dicarboxylic acids, such as terephthalic acid, isophthalic acid, phthalic acid, and naphthalenedicarboxylic acid; anhydrides of these dicarboxylic acids; and lower (e.g., 1 to 5 carbon atoms) alkyl esters of these dicarboxylic acids. Among these polyvalent carboxylic acids, for example, aromatic dicarboxylic acids may be used.

Trivalent or higher carboxylic acids having a crosslinked structure or a branched structure may be used as a polyvalent carboxylic acid in combination with the dicarboxylic acids. Examples of the trivalent or higher carboxylic acids include trimellitic acid, pyromellitic acid, anhydrides of these carboxylic acids, and lower (e.g., 1 to 5 carbon atoms) alkyl esters of these carboxylic acids.

The above polyvalent carboxylic acids may be used alone or in combination of two or more.

Examples of the polyhydric alcohol include aliphatic diols, such as ethylene glycol, diethylene glycol, triethylene glycol, propylene glycol, butanediol, hexanediol, and neopentyl glycol; alicyclic diols, such as cyclohexanediol, cyclohexanedimethanol, and hydrogenated bisphenol A; and aromatic diols, such as bisphenol A-ethylene oxide adduct and bisphenol A-propylene oxide adduct. Among these polyhydric alcohols, for example, aromatic diols and alicyclic diols may be used. In particular, aromatic diols may be used.

Trihydric or higher alcohols having a crosslinked structure or a branched structure may be used as a polyhydric alcohol in combination with the diols. Examples of the trihydric or higher alcohols include glycerin, trimethylolpropane, and pentaerythritol.

The above polyhydric alcohols may be used alone or in combination of two or more.

The glass transition temperature Tg of the amorphous polyester resin is preferably 50° C. or more and 80° C. or less and is more preferably 50° C. or more and 65° C. or less.

The glass transition temperature of the amorphous polyester resin is determined from a differential scanning calorimetry (DSC) curve obtained by DSC. More specifically, the glass transition temperature of the amorphous polyester resin is determined from the "extrapolated glass-transition-starting temperature" according to a method for determining glass transition temperature which is described in JIS K 7121:1987 "Testing Methods for Transition Temperatures of Plastics".

The weight average molecular weight Mw of the amorphous polyester resin is preferably 5,000 or more and 1,000,000 or less and is more preferably 7,000 or more and 500,000 or less.

The number average molecular weight Mn of the amorphous polyester resin may be 2,000 or more and 100,000 or less.

The molecular weight distribution index Mw/Mn of the amorphous polyester resin is preferably 1.5 or more and 100 or less and is more preferably 2 or more and 60 or less.

The weight average molecular weight and number average molecular weight of the amorphous polyester resin are determined by gel permeation chromatography (GPC). Specifically, the molecular weights of the amorphous polyester resin are determined by GPC using a "HLC-8120GPC" produced by Tosoh Corporation as measuring equipment, a column "TSKgel SuperHM-M (15 cm)" produced by Tosoh Corporation, and a tetrahydrofuran (THF) solvent. The weight average molecular weight and number average molecular weight of the amorphous polyester resin are determined on the basis of the results of the measurement using a molecular-weight calibration curve based on monodisperse polystyrene standard samples.

The amorphous polyester resin may be produced by any suitable production method known in the related art. Specifically, the amorphous polyester resin may be produced by, for example, a method in which polymerization is performed at 180° C. or more and 230° C. or less, the pressure inside the reaction system is reduced as needed, and water and alcohols that are generated by condensation are removed. In the case where the raw materials, that is, the monomers, are not dissolved in or miscible with each other at the reaction temperature, a solvent having a high boiling point may be used as a dissolution adjuvant in order to dissolve the raw materials. In such a case, the condensation polymerization reaction is performed while the dissolution adjuvant is distilled away. In the case where monomers having low miscibility with each other are present, a condensation reaction of the monomers with an acid or alcohol that is to undergo a polycondensation reaction with the monomers may be performed in advance and subsequently polycondensation of the resulting polymers with the other components may be performed.

Crystalline Polyester Resin

Examples of the crystalline polyester resin include condensation polymers of a polyvalent carboxylic acid and a polyhydric alcohol. The crystalline polyester resin may be commercially available one or a synthesized one.

In order to increase ease of forming a crystal structure, a condensation polymer prepared from polymerizable monomers having a linear aliphatic group may be used as a crystalline polyester resin instead of a condensation polymer prepared from polymerizable monomers having an aromatic group.

Examples of the polyvalent carboxylic acid include aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids, such as dibasic acids (e.g., phthalic acid, isophthalic acid, terephthalic acid, and naphthalene-2,6-dicarboxylic acid); anhydrides of these dicarboxylic acids; and lower (e.g., 1 to 5 carbon atoms) alkyl esters of these dicarboxylic acids.

Trivalent or higher carboxylic acids having a crosslinked structure or a branched structure may be used as a polyvalent carboxylic acid in combination with the dicarboxylic acids. Examples of the trivalent carboxylic acids include aromatic carboxylic acids, such as 1,2,3-benzenetricarboxylic acid, 1,2,4-benzenetricarboxylic acid, and 1,2,4-naphthalenetricarboxylic acid; anhydrides of these tricarboxylic acids; and lower (e.g., 1 to 5 carbon atoms) alkyl esters of these tricarboxylic acids.

Dicarboxylic acids including a sulfonic group and dicarboxylic acids including an ethylenic double bond may be used as a polyvalent carboxylic acid in combination with the above dicarboxylic acids.

The above polyvalent carboxylic acids may be used alone or in combination of two or more.

Examples of the polyhydric alcohol include aliphatic diols, such as linear aliphatic diols including a backbone having 7 to 20 carbon atoms. Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these aliphatic diols, 1,8-octanediol, 1,9-nonanediol, and 1,10-decanediol may be used.

Trihydric or higher alcohols having a crosslinked structure or a branched structure may be used as a polyhydric alcohol in combination with the above diols. Examples of the trihydric or higher alcohols include glycerin, trimethylolethane, trimethylolpropane, and pentaerythritol.

The above polyhydric alcohols may be used alone or in combination of two or more.

The content of the aliphatic diols in the polyhydric alcohol may be 80 mol % or more and is preferably 90 mol % or more.

The melting temperature of the crystalline polyester resin is preferably 50° C. or more and 100° C. or less, is more preferably 55° C. or more and 90° C. or less, and is further preferably 60° C. or more and 85° C. or less.

The melting temperature of the crystalline polyester resin is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The crystalline polyester resin may have a weight average molecular weight Mw of 6,000 or more and 35,000 or less.

The crystalline polyester resin may be produced by a production method known in the related art similarly to the amorphous polyester and the like.

Examples of the vinyl resin include homopolymers of the following monomers and copolymers of two or more monomers selected from the following monomers: styrenes, such as styrene, para-chlorostyrene, and α-methylstyrene; (meth) acrylates, such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; ethylenically unsaturated nitriles, such as acrylonitrile and methacrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as ethylene, propylene, and butadiene.

The content of the binder resin in the entire toner particles is, for example, preferably 40% by mass or more and 95% by mass or less, is more preferably 50% by mass or more and 90% by mass or less, and is further preferably 60% by mass or more and 85% by mass or less.

Colorant

Examples of the colorant include various pigments, such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and various dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The above colorants may be used alone or in combination of two or more.

The colorant may optionally be subjected to a surface treatment and may be used in combination with a dispersant. A plurality of types of colorants may be used in combination.

The content of the colorant in the entire toner particles is, for example, preferably 1% by mass or more and 30% by mass or less and is more preferably 3% by mass or more and 15% by mass or less.

Release Agent

Examples of the release agent include, but are not limited to, hydrocarbon waxes; natural waxes, such as a carnauba wax, a rice bran wax, and a candelilla wax; synthetic or mineral-petroleum-derived waxes, such as a montan wax; and ester waxes, such as a fatty-acid ester wax and a montanate wax.

The melting temperature of the release agent is preferably 50° C. or more and 110° C. or less and is more preferably 60° C. or more and 100° C. or less.

The melting temperature of the release agent is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The content of the release agent in the entire toner particles is, for example, preferably 1% by mass or more and 20% by mass or less and is more preferably 5% by mass or more and 15% by mass or less.

Other Additives

Examples of the other additives include additives known in the related art, such as a magnetic substance, a charge-controlling agent, and an inorganic powder. These additives may be added to the toner particles as internal additives.

Properties, Etc. of Toner Particles

The toner particles may have a single-layer structure or a "core-shell" structure constituted by a core (i.e., core particle) and a coating layer (i.e., shell layer) covering the core.

The core-shell structure of the toner particles may be constituted by, for example, a core including a binder resin and, as needed, other additives such as a colorant and a release agent and by a coating layer including the binder resin.

The volume average diameter D50v of the toner particles is preferably 2 μm or more and 10 μm or less and is more preferably 4 μm or more and 8 μm or less.

The various average particle sizes and various particle size distribution indices of the toner particles are measured using "COULTER MULTISIZER II" produced by Beckman Coulter, Inc. with an electrolyte "ISOTON-II" produced by Beckman Coulter, Inc. in the following manner.

A sample to be measured (0.5 mg or more and 50 mg or less) is added to 2 ml of a 5%-aqueous solution of a surfactant (e.g., sodium alkylbenzene sulfonate) that serves as a dispersant. The resulting mixture is added to 100 ml or more and 150 ml or less of an electrolyte.

The resulting electrolyte containing the sample suspended therein is subjected to a dispersion treatment for 1 minute using an ultrasonic disperser, and the distribution of the diameters of particles having a diameter of 2 μm or more and 60 μm or less is measured using COULTER MULTISIZER II with an aperture having a diameter of 100 μm. The number of the particles sampled is 50,000.

The particle diameter distribution measured is divided into a number of particle diameter ranges (i.e., channels). For each range, in ascending order in terms of particle diameter, the cumulative volume and the cumulative number are calculated and plotted to draw cumulative distribution curves. Particle diameters at which the cumulative volume and the cumulative number reach 16% are considered to be the volume particle diameter D16v and the number particle diameter D16p, respectively. Particle diameters at which the cumulative volume and the cumulative number reach 50% are considered to be the volume average particle diameter D50v and the number average particle diameter D50p, respectively. Particle diameters at which the cumulative volume and the cumulative number reach 84% are considered to be the volume particle diameter D84v and the number particle diameter D84p, respectively.

Using the volume particle diameters and number particle diameters measured, the volume particle size distribution index (GSDv) is calculated as $(D84v/D16v)^{1/2}$ and the number particle size distribution index (GSDp) is calculated as $(D84p/D16p)^{1/2}$.

The toner particles preferably has an average circularity of 0.94 or more and 1.00 or less. The average circularity of the toner particles is more preferably 0.95 or more and 0.98 or less.

The average circularity of the toner particles is determined as [Equivalent circle perimeter]/[Perimeter] (i.e., [Perimeter of a circle having the same projection area as the particles]/[Perimeter of the projection image of the particles]. Specifically, the average circularity of the toner particles is determined by the following method.

The toner particles to be measured are sampled by suction so as to form a flat stream. A static image of the particles is taken by instantaneously flashing a strobe light. The image of the particles is analyzed with a flow particle image analyzer "FPIA-3000" produced by Sysmex Corporation. The number of samples used for determining the average circularity of the toner particles is 3,500.

In the case where the toner includes an external additive, the toner (i.e., the developer) to be measured is dispersed in water containing a surfactant and then subjected to an ultrasonic wave treatment in order to remove the external additive from the toner particles.

External Additive

Examples of the external additive include inorganic particles. Examples of the inorganic particles include $SiO_2$ particles, $TiO_2$ particles, $Al_2O_3$ particles, CuO particles, ZnO particles, $SnO_2$ particles, $CeO_2$ particles, $Fe_2O_3$ particles, MgO particles, BaO particles, CaO particles, $K_2O$ particles, $Na_2O$ particles, $ZrO_2$ particles, $CaO·SiO_2$ particles, $K_2O·(TiO_2)_n$ particles, $Al_2O_3·2SiO_2$ particles, $CaCO_3$ particles, $MgCO_3$ particles, $BaSO_4$ particles, and $MgSO_4$ particles.

The surfaces of the inorganic particles used as an external additive may be subjected to a hydrophobic treatment. The hydrophobic treatment is performed by, for example, immersing the inorganic particles in a hydrophobizing agent. Examples of the hydrophobizing agent include, but are not limited to, a silane coupling agent, a silicone oil, a titanate coupling agent, and aluminum coupling agent. These hydrophobizing agents may be used alone or in combination of two or more.

The amount of the hydrophobizing agent is commonly, for example, 1 part by mass or more and 10 parts by mass or less relative to 100 parts by mass of the inorganic particles.

Examples of the external additive further include particles of a resin, such as polystyrene, polymethyl methacrylate (PMMA), or a melamine resin; and particles of a cleaning lubricant, such as a metal salt of a higher fatty acid, such as zinc stearate, or a fluorine-contained resin.

The amount of the external additive used is, for example, preferably 0.01% by mass or more and 5% by mass or less and is more preferably 0.01% by mass or more and 2.0% by mass or less of the amount of the toner particles.

EXAMPLES

Examples are described below. The exemplary embodiments of the present disclosure are not limited to Examples below. In the following description, "part" and "%" are all on a mass basis unless otherwise specified.

Example 1

Step 1

Resin Particle Dispersion Liquid Preparation Step

Preparation of Amorphous Polyester Resin Particle Dispersion Liquid

Terephthalic acid: 30 molar parts

Fumaric acid: 70 molar parts

Bisphenol A-ethylene oxide adduct: 5 molar parts

Bisphenol A-propylene oxide adduct: 95 molar parts

The above materials are charged into a flask equipped with a stirring apparatus, a nitrogen introduction tube, a temperature sensor, and a fractionating column. Subsequently, the temperature is increased to 220° C. over 1 hour. Then, 1 part of titanium tetraethoxide is added to the flask relative to 100 parts of the total amount of the above materials. While the product water is removed by distillation, the temperature is then increased to 230° C. over 30 minutes and a dehydration condensation reaction is continued for 1 hour at 230° C. Subsequently, the product of the reaction is cooled. Hereby, an amorphous polyester resin (weight average molecular weight: 18,000, glass transition temperature: 59° C.) is prepared.

Into a container equipped with a temperature control device and a nitrogen purging device, 40 parts of ethyl acetate and 25 parts of 2-butanol are charged. After the resulting mixture has been formed into a mixed solvent, 100 parts of the amorphous polyester resin is gradually charged into the container to form a solution. To the solution, a 10% aqueous ammonia solution is added in an amount equivalent to an amount three times the acid value of the resin in terms of molar ratio. The resulting liquid mixture is stirred for 30 minutes. Subsequently, the inside of the container is purged with a dry nitrogen gas. While the temperature is maintained to be 40° C. and the liquid mixture is stirred, 400 parts of ion-exchange water is added dropwise to the container to perform emulsification. After the addition of the ion-exchange water has been terminated, the resulting emulsion liquid is cooled to 25° C. Hereby, a resin particle dispersion liquid containing resin particles having a volume average particle size of 180 nm is prepared. The solid content in the resin particle dispersion liquid is adjusted to be 20% by the addition of ion-exchange water. Hereby, an amorphous polyester resin particle dispersion liquid is prepared.

Preparation of Crystalline Polyester Resin Particle Dispersion Liquid

Decanedioic acid: 81 parts

Hexanediol: 47 parts

The above materials are charged into a flask and heated to 160° C. over 1 hour. After it has been confirmed that the inside of the reaction system is uniformly stirred, 0.03 parts of dibutyltin oxide is charged into the flask. While the product water is removed by distillation, the temperature is increased to 200° C. over 6 hours and stirring is continued for 4 hours at 200° C. The reaction solution is cooled and solid-liquid separation is subsequently performed. The resulting solid substance is dried at 40° C. at reduced pressure. Hereby, a crystalline polyester resin having a weight average molecular weight of 15,000 and a melting point of 64° C. is prepared.

Then, 50 parts of the crystalline polyester resin, 2 parts of an anionic surfactant "NEOGEN RK" produced by Dai-ichi Kogyo Seiyaku Co., Ltd., and 200 parts of ion-exchange water are mixed. The resulting mixture is heated to 120° C. and sufficiently dispersed with a homogenizer "ULTRA-TURRAX T50" produced by IKA. A further dispersion treatment is performed with a pressure-discharge homogenizer. The resulting dispersion liquid is collected when the volume average particle size thereof reaches 180 nm. Hereby, a crystalline polyester resin particle dispersion liquid having a solid content of 20% is prepared.

Preparation of Vinyl Resin Particle Dispersion Liquid

The above components are charged into a reaction container equipped with a reflux condenser, a stirrer, a nitrogen introduction tube, and a monomer dropping port. The resulting mixture is stirred to a sufficient degree at room temperature (25° C.) to prepare an emulsion liquid (1).

Styrene produced by Wako Pure Chemical Industries, Ltd.: 8 parts n-Butyl acrylate produced by Wako Pure Chemical Industries, Ltd.: 2 parts Dodecanethiol produced by Wako Pure Chemical Industries, Ltd.: 0.05 parts Anionic surfactant "Newcol 271A" produced by Nippon Nyukazai Co., Ltd.: 4 parts Ion-exchange water: 500 parts Into another container equipped with a stirrer, the following components are charged. The resulting mixture is stirred to perform emulsification. Hereby, an emulsion liquid (2) is prepared.

Styrene produced by Wako Pure Chemical Industries, Ltd.: 470 parts n-Butyl acrylate produced by Wako Pure Chemical Industries, Ltd.: 118 parts Dodecanethiol produced by Wako Pure Chemical Industries, Ltd.: 2 parts Anionic surfactant "Newcol 271A" produced by Nippon Nyukazai Co., Ltd.: 4 parts Ion-exchange water: 846 parts After the inside of the emulsion liquid (1) has been purged with nitrogen to a sufficient degree, the temperature is increased to 75° C. while nitrogen is further introduced to the emulsion liquid (1). Subsequently, 50 parts of a 10% aqueous ammonium persulfate (APS) solution is added to the emulsion liquid (1), and heating is then performed for 20 minutes. Subsequently, the emulsion liquid (2) is gradually added dropwise to the reaction container including the emulsion liquid (1) through the monomer dropping port of the reaction container over 2 hours with a pump. The reaction is continued at 75° C. While the temperature is maintained at 75° C., 5 parts of the 10% aqueous APS solution is added to the reaction container 30 minutes after the completion of the addition of the emulsion liquid (2). After 30 minutes, another 5 parts of the 10% aqueous solution is added to the reaction container. Then, the temperature is maintained at 75° C. for 1.5 hours. Subsequently, cooling is performed. Hereby, a vinyl resin particle dispersion liquid having a volume average particle size of 140 nm and a solid content of 30% by mass is prepared.

Preparation of Colorant Particle Dispersion Liquid

Carbon black "#25B" produced by Mitsubishi Chemical Corporation: 20 parts

Anionic surfactant "NEOGEN SC" produced by Dai-ichi Kogyo Seiyaku Co., Ltd.: 2 parts Ion-exchange water: 80 parts The above components are mixed with one another. The resulting mixture is dispersed for 1 hour with a high-pressure impact disperser "Ultimaizer HJP30006" produced by Sugino Machine Limited to form a colorant particle dispersion liquid having a volume average particle size of 180 nm and a solid content of 20% by mass.

Preparation of Release Agent Particle Dispersion Liquid

Paraffin wax "FNP92" produced by Nippon Seiro Co., Ltd. (endothermic peak onset: 81° C.): 45 parts Anionic surfactant "Neogen RK" produced by Dai-ichi Kogyo Seiyaku Co., Ltd.: 5 parts Ion-exchange water: 200 parts The above materials are mixed with one another and heated to 95° C. The resulting mixture is dispersed with a homogenizer "ULTRA-TURRAX T50" produced by IKA and then further dispersed with Manton Gaulin high-pressure homogenizer produced by Gaulin. Hereby, a release agent particle dispersion liquid (solid component concentration: 20%) in which release agent particles are dispersed is prepared. The release agent particles have a volume average size of 0.19 μm.

Aggregated Particle Formation Step And Fusion Coalescence Step

Ion-exchange water: 250 parts

Amorphous polyester resin particle dispersion liquid: 225 parts

Crystalline polyester resin particle dispersion liquid: 150 parts

Vinyl resin particle dispersion liquid: 75 parts

Release agent particle dispersion liquid: 75 parts

Colorant particle dispersion liquid: 38 parts

Anionic surfactant (TaycaPower): 3.0 parts

The above material (hereinafter, also referred to as "charged materials") are charged into a stirring tank equipped with a jacket thermostat. After the pH has been adjusted to 3.5 by the addition of a 0.1N aqueous nitric acid solution, an aqueous polyaluminum chloride solution prepared by dissolving 2 parts of polyaluminum chloride produced by Oji Paper Co., Ltd. (30% powder product) in 30 parts of ion-exchange water is added to the tank. Then, a dispersion treatment is performed with a homogenizer. Subsequently, the temperature is increased to 45° C. Then, holding is performed until the volume average particle size reaches 4.9 μm. Subsequently, 75 parts of the amorphous polyester resin particle dispersion liquid is added to the tank. Then, holding is performed for 30 minutes. When the volume average particle size reaches 5.2 μm, another 75 parts of the amorphous polyester resin particle dispersion liquid is added to the tank. Then, holding is performed for 30 minutes. Subsequently, 20 parts of a 10% aqueous solution of nitrilotriacetic acid (NTA) metal salt "CHELEST 70" produced by Chelest Corporation is added. Then, the pH is adjusted to be 9.0 by the addition of a 1 N aqueous sodium hydroxide solution. Subsequently, 1 part of an anionic surfactant (TaycaPower) is charged to the tank. While stirring is continued, the temperature is increased to 85° C. and holding is performed for 5 hours. Then, the temperature is reduced to 20° C. at a rate of 20° C./min. Hereby, a toner particle dispersion liquid in which toner particles that include an amorphous polyester resin, a crystalline polyester resin, and a vinyl resin are dispersed is prepared.

Step 1.5 and Step 2

The toner particle dispersion liquid is charged into a filter press produced by Tokyo Engineering K.K. and compressed at a compressive pressure of 0.4 MPa to form a cake in the device. Water (wash water A) is passed through the inside of the cake in an amount that is 600% by mass of the amount of the toner particles included in the cake. Subsequently, an aqueous nitric acid solution (acid concentration: 2 mmol/l) used as an acidic water is passed through the inside of the cake in an amount that is 300% by mass of the amount of the toner particles.

Step 3

Then, water (wash water B) is passed through the inside of the cake in an amount that is 500% by mass of the amount of the toner particles.

Other Steps

Subsequently, the cake is removed from the device and dried. Hereby, toner particles are prepared. The toner particles have a volume average particle size of 5.5 μm.

External Addition Step

With 100 parts of the toner particles, 1.5 parts of hydrophobic silica "RY50" produced by Nippon Aerosil Co., Ltd. is mixed for 30 seconds using a sample mill at a rotation speed of 13,000 rpm. The resulting mixture is sieved through a vibration sieve having an opening of 45 μm. Hereby, a toner is prepared.

Examples 2 to 29 and 31 and Comparative Examples 1 and 2

Toner particles are prepared as in Example 1, except that the amounts of the amorphous polyester resin particle dispersion liquid (in Table 1, "AmoPES particle dispersion liquid"), the crystalline polyester resin particle dispersion liquid (in Table 1, "CryPES particle dispersion liquid"), and the vinyl resin particle dispersion liquid (in Table 1, "Vin particle dispersion liquid") included in the charged materials used in the aggregated particle formation step and the fusion coalescence step, the amount of wash water A, the amount of wash water B, the acid concentration in the acidic water, the amount of acidic water, and the temperature of the acidic water are changed as described in Table 1.

Example 30

Toner particles are prepared as in Example 1, except that an aqueous sulfuric acid solution is used as acidic water.

In each of Examples, "the Na content in the surfaces of the toner particles that have not been subjected to the step 2 (Na content$_{Befor}$)", "the Na content in the surfaces of the toner particles that have been subjected to the step 2 (Na conten- $t_{After}$)", "the anion content in the surfaces of the toner particles that have not been subjected to the step 2 (anion content$_{Befor}$)", "the anion content in the surfaces of the toner particles that have been subjected to the step 2 (anion content$_{After2}$)", and "the anion content in the surfaces of the toner particles that have been subjected to the step 3 (anion content$_{After3}$)" are determined in the above-described procedures. Table 1 lists the values measured.

In Table 1, "ΔNa" represents the drop from the Na content in the surfaces of the toner particles that have not been subjected to the step 2 (Na content$_{Befor}$) to the Na content in the surfaces of the toner particles that have been subjected to the step 2 (Na content$_{After}$).

In Table 1, "Δanion" represents the rise from the anion content in the surfaces of the toner particles that have not been subjected to the step 2 (anion content$_{Befor}$) to the anion content in the surfaces of the toner particles that have been subjected to the step 2 (anion content$_{After2}$).

The "Na content$_{After3}$" in Table 1 is derived by subjecting the toner particles dried in "Other Steps" to ion chromatography in the above-described procedure as toner particles that have been subjected to the step 3.

In Table 1, "-" in Comparative Example 1 means that the step 2 is omitted in Comparative Example 1.

Table 2 lists the compositions of the binder resins included in the toner particles prepared in Examples and Comparative Examples.

Note that the values listed in Table 2 are the ratios of the masses of the amorphous polyester resin, the crystalline polyester resin, or the vinyl resin to the total mass of the toner particles.

Evaluations

Image Evaluation

The developer prepared in the following procedure is attached to a developing unit of a modification of "DocuCentreColor400" produced by FUJIFILM Business Innovation Corp. and an image evaluation is conducted.

Procedure for Preparation of Developer

Preparation of Carrier

Into a pressure kneader, 100 parts of ferrite particles produced by Powdertech Co., Ltd. (average particle size: 50 μm), 1.5 parts of a polymethyl methacrylate resin produced by Mitsubishi Rayon Co., Ltd. (weight average molecular weight: 95,000, the proportion of component having a weight average molecular weight of 10,000 or less is 5%), and 500 parts of toluene are charged. The resulting mixture is stirred at normal temperature for 15 minutes. Subsequently, while stirring is performed under reduced pressure, the temperature is increased to 70° C. in order to remove toluene by distillation. Then, cooling is performed. Subsequently, screening is performed with a 105-μm sieve. Hereby, a resin-covered carrier is prepared.

Preparation of Developer

Into a V-blender, 10 parts of one of the toners prepared in Examples and Comparative Examples and 100 parts of the resin-covered carrier are charged. The resulting mixture is stirred for 20 minutes. Then, sieving is performed through a vibration sieve having an opening of 212 μm. Hereby, a developer is prepared.

Real Machine Evaluation

In a high temperature-high humidity environment (30° C., 85% RH), an image having an area coverage of 40% is formed on 1,000 sheets. Subsequently, in a low temperature-low humidity environment (10° C., 15% RH), the same image as above is formed on 1,000 sheets. The same operation as above is repeated three times in total. Then, the same image as above is formed at 20° C. and 50% RH. This image is visually confirmed and evaluated in terms of colored streaks and colored spots in accordance with the following evaluation criteria.

Table 2 lists the evaluation results.

Criteria for Evaluation of Colored Streaks

A (Good): The colored streaks are not confirmed at all, and an excellent image is formed.

B (Fair): The colored streaks are slightly confirmed but at an acceptable level, and a good image is formed.

C (Poor): The colored streaks are clearly confirmed visually.

Criteria for Evaluation of Colored Spots

A (Good): The colored spots are not confirmed at all, and an excellent image is formed.

B (Fair): The colored spots are slightly confirmed but at an acceptable level, and a good image is formed.

C (Poor): The colored spots are clearly confirmed visually.

Yield Evaluation

In each of Examples and Comparative Examples, after the cake has been removed in "Other Steps", 100 g of cake is taken for yield evaluation. The moisture content in the cake taken for yield evaluation is measured and subtracted from the mass of the cake taken for yield evaluation to calculate the mass (hereinafter, referred to as "mass A") of the toner particles included in the cake taken for yield evaluation.

Then, the whole amount of the cake taken for yield evaluation is dried to prepare dried toner particles. The whole amount of the dried toner particles are sieved through a screen having an opening of 100 μm. The mass (hereinafter, referred to as "mass B") of the toner particles that have passed through the screen is measured.

The yield is calculated using the following formula, and yield evaluation is performed on the basis of the yield in accordance with the following evaluation criteria. The higher the yield, the higher the likelihood of production of toner particles including less coarse particles. Table 2 lists the evaluation results.

$$\text{Yield (\%)}=\text{Mass } B/\text{Mass } A$$

Criteria for Evaluation of Yield

A (Good): The yield is 95% or more.

B (Fair): The yield is 90% or more and less than 95%.

C (Poor): The yield is less than 90%.

TABLE 1-1

| | Amount of AmoPES particle dispersion liquid added part | Amount of CryPES particle dispersion liquid added part | Amount of Vin particle dispersion liquid added part | Amount of water passed | | Concentration of acidic water mmol/L | Amount of acidic water used mass % | Temperature of acidic water ° C. |
|---|---|---|---|---|---|---|---|---|
| | | | | Wash water A mass % | Wash water B mass % | | | |
| Example 1 | 225 | 150 | 75 | 600 | 500 | 2.0 | 300 | 30 |
| Example 2 | 225 | 150 | 75 | 300 | 500 | 2.0 | 600 | 30 |
| Example 3 | 225 | 150 | 75 | 148 | 500 | 2.0 | 1,020 | 30 |
| Example 4 | 225 | 150 | 75 | 150 | 500 | 2.0 | 1,000 | 30 |
| Example 5 | 225 | 150 | 75 | 180 | 500 | 2.0 | 1,000 | 30 |
| Example 6 | 300 | 113 | 50 | 600 | 500 | 2.0 | 200 | 30 |

TABLE 1-1-continued

| | | | | | | | | |
|---|---|---|---|---|---|---|---|---|
| Example 7 | 375 | 75 | 25 | 600 | 500 | 2.0 | 180 | 30 |
| Example 8 | 225 | 150 | 75 | 300 | 1,000 | 2.0 | 1,020 | 30 |
| Example 9 | 225 | 150 | 75 | 300 | 1,200 | 2.0 | 1,000 | 30 |
| Example 10 | 225 | 150 | 75 | 300 | 2,000 | 2.0 | 1,000 | 30 |
| Example 11 | 278 | 135 | 50 | 600 | 200 | 2.0 | 200 | 30 |
| Example 12 | 278 | 135 | 50 | 600 | 800 | 2.0 | 200 | 30 |
| Example 13 | 278 | 135 | 50 | 600 | 800 | 2.0 | 180 | 30 |
| Example 14 | 225 | 150 | 75 | 148 | 1,000 | 2.0 | 1,020 | 30 |
| Example 15 | 225 | 150 | 75 | 150 | 1,200 | 2.0 | 1,000 | 30 |
| Example 16 | 225 | 150 | 75 | 180 | 2,000 | 2.0 | 1,000 | 30 |

| | Na content | | | | Anion content | | | |
|---|---|---|---|---|---|---|---|---|
| | Na content Befor mg/L | Na content After mg/L | ΔNa mg/L | Na content After3 mg/L | Anion content Befor mg/L | Anion content After2 mg/L | Δanion mg/L | Anion content After3 mg/L |
| Example 1 | 1 | 0.15 | 0.85 | 0.15 | 0.04 | 1.5 | 1.46 | 0.03 |
| Example 2 | 1.5 | 0.3 | 1.2 | 0.29 | 0.05 | 2.5 | 2.45 | 0.1 |
| Example 3 | 2.45 | 0.42 | 2.03 | 0.41 | 0.1 | 4.3 | 4.2 | 0.15 |
| Example 4 | 2.4 | 0.4 | 2 | 0.4 | 0.1 | 4.2 | 4.1 | 0.15 |
| Example 5 | 2.05 | 0.05 | 2 | 0.05 | 0.08 | 4.2 | 4.12 | 0.15 |
| Example 6 | 0.5 | 0.4 | 0.10 | 0.39 | 0.05 | 1.2 | 1.15 | 0.03 |
| Example 7 | 0.12 | 0.03 | 0.09 | 0.03 | 0.05 | 1.1 | 1.05 | 0.02 |
| Example 8 | 1.5 | 0.21 | 1.29 | 0.21 | 0.05 | 5.08 | 5.03 | 0.12 |
| Example 9 | 1.5 | 0.2 | 1.3 | 0.2 | 0.05 | 5.04 | 4.99 | 0.1 |
| Example 10 | 1.5 | 0.2 | 1.3 | 0.19 | 0.05 | 5.05 | 5 | 0.001 |
| Example 11 | 0.8 | 0.3 | 0.5 | 0.3 | 0.05 | 1.05 | 1 | 0.1 |
| Example 12 | 0.8 | 0.3 | 0.5 | 0.3 | 0.05 | 1.05 | 1 | 0.001 |
| Example 13 | 0.8 | 0.32 | 0.48 | 0.32 | 0.05 | 1 | 0.95 | 0 |
| Example 14 | 2.45 | 0.42 | 2.03 | 0.41 | 0.1 | 5.13 | 5.03 | 0.12 |
| Example 15 | 2.4 | 0.4 | 2 | 0.4 | 0.1 | 5.1 | 5 | 0.1 |
| Example 16 | 2.05 | 0.05 | 2 | 0.05 | 0.08 | 5.08 | 5 | 0.001 |

TABLE 1-2

| | Amount of AmoPES particle dispersion liquid added part | Amount of CryPES particle dispersion liquid added part | Amount of Vin particle dispersion liquid added part | Amount of water passed | | Concen-tration of acidic water mmol/L | Amount of acidic water used mass % | Temper-ature of acidic water ° C. |
|---|---|---|---|---|---|---|---|---|
| | | | | Wash water A mass % | Wash water B mass % | | | |
| Example 17 | 300 | 113 | 50 | 600 | 200 | 2.0 | 200 | 30 |
| Example 18 | 300 | 113 | 50 | 600 | 800 | 2.0 | 200 | 30 |
| Example 19 | 375 | 75 | 25 | 600 | 800 | 2.0 | 180 | 30 |
| Example 20 | 225 | 150 | 75 | 600 | 500 | 0.4 | 300 | 30 |
| Example 21 | 225 | 150 | 75 | 600 | 500 | 0.5 | 300 | 30 |
| Example 22 | 225 | 150 | 75 | 600 | 500 | 8.0 | 300 | 30 |
| Example 23 | 225 | 150 | 75 | 600 | 500 | 8.2 | 300 | 30 |
| Example 24 | 225 | 150 | 75 | 300 | 500 | 2.0 | 600 | 38 |
| Example 25 | 225 | 150 | 75 | 300 | 500 | 2.0 | 600 | 35 |
| Example 26 | 150 | 263 | 50 | 600 | 1000 | 2.0 | 1000 | 30 |
| Example 27 | 188 | 225 | 50 | 600 | 1000 | 2.0 | 1000 | 30 |
| Example 28 | 338 | 75 | 50 | 600 | 500 | 2.0 | 600 | 30 |
| Example 29 | 353 | 60 | 50 | 600 | 500 | 2.0 | 600 | 30 |
| Example 30 | 225 | 150 | 75 | 600 | 500 | 2.0 | 300 | 30 |
| Example 31 | 225 | 150 | 75 | 0 | 1500 | 2.0 | 2000 | 30 |
| Comparative example 1 | 225 | 150 | 75 | 2000 | 0 | — | — | — |
| Comparative example 2 | 300 | 188 | 0 | 600 | 500 | 2.0 | 300 | 30 |

| | Na content | | | | Anion content | | | |
|---|---|---|---|---|---|---|---|---|
| | Na content Befor mg/L | Na content After mg/L | ΔNa mg/L | Na content After3 mg/L | Anion content Befor mg/L | Anion content After2 mg/L | Δanion mg/L | Anion content After3 mg/L |
| Example 17 | 0.5 | 0.4 | 0.10 | 0.40 | 0.05 | 1.05 | 1 | 0.1 |
| Example 18 | 0.5 | 0.4 | 0.10 | 0.39 | 0.05 | 1.05 | 1 | 0.001 |
| Example 19 | 0.12 | 0.03 | 0.09 | 0.03 | 0.05 | 1 | 0.95 | 0 |

TABLE 1-2-continued

| | | | | | | | | |
|---|---|---|---|---|---|---|---|---|
| Example 20 | 1 | 0.43 | 0.57 | 0.42 | 0.04 | 0.7 | 0.66 | 0.008 |
| Example 21 | 1 | 0.4 | 0.6 | 0.4 | 0.04 | 0.75 | 0.71 | 0.01 |
| Example 22 | 1 | 0.04 | 0.96 | 0.04 | 0.04 | 5.44 | 5.4 | 0.18 |
| Example 23 | 1 | 0.03 | 0.97 | 0.02 | 0.04 | 5.48 | 5.44 | 0.2 |
| Example 24 | 1.5 | 0.25 | 1.25 | 0.24 | 0.05 | 2.5 | 2.45 | 0.1 |
| Example 25 | 1.5 | 0.28 | 1.22 | 0.27 | 0.05 | 2.5 | 2.45 | 0.1 |
| Example 26 | 2 | 0.45 | 1.55 | 0.44 | 0.04 | 5.05 | 5.01 | 0.12 |
| Example 27 | 1.8 | 0.4 | 1.4 | 0.39 | 0.04 | 5.03 | 4.99 | 0.1 |
| Example 28 | 0.3 | 0.04 | 0.26 | 0.04 | 0.04 | 1.5 | 1.46 | 0.03 |
| Example 29 | 0.2 | 0.03 | 0.17 | 0.03 | 0.04 | 1.5 | 1.46 | 0.03 |
| Example 30 | 1 | 0.2 | 0.8 | 0.19 | 0.04 | 2.5 | 2.46 | 0.08 |
| Example 31 | 4.51 | 0.44 | 4.07 | 0.43 | 5.5 | 6.62 | 1.12 | 0.12 |
| Comparative example 1 | 0.8 | — | — | 0.8 | 0.04 | — | — | 0.01 |
| Comparative example 2 | 1.8 | 1.1 | 0.7 | 1.0 | 0.04 | 1.5 | 1.46 | 0.03 |

TABLE 2-1

| | Amorphous polyester resin mass % | Crystalline polyester resin mass % | Vinyl resin mass % | Colored streaks | Colored spots | Yield |
|---|---|---|---|---|---|---|
| Example 1 | 50 | 20 | 15 | A(Good) | A(Good) | A(Good) |
| Example 2 | 50 | 20 | 15 | A(Good) | A(Good) | A(Good) |
| Example 3 | 50 | 20 | 15 | B(Fair) | B(Fair) | B(Fair) |
| Example 4 | 50 | 20 | 15 | A(Good) | B(Fair) | A(Good) |
| Example 5 | 50 | 20 | 15 | A(Good) | A(Good) | A(Good) |
| Example 6 | 60 | 15 | 10 | A(Good) | B(Fair) | A(Good) |
| Example 7 | 70 | 10 | 5 | B(Fair) | B(Fair) | A(Good) |
| Example 8 | 50 | 20 | 15 | B(Fair) | B(Fair) | B(Fair) |
| Example 9 | 50 | 20 | 15 | A(Good) | B(Fair) | B(Fair) |
| Example 10 | 50 | 20 | 15 | A(Good) | A(Good) | B(Fair) |
| Example 11 | 57 | 18 | 10 | A(Good) | A(Good) | A(Good) |
| Example 12 | 57 | 18 | 10 | A(Good) | A(Good) | A(Good) |
| Example 13 | 57 | 18 | 10 | A(Good) | A(Good) | B(Fair) |
| Example 14 | 50 | 20 | 15 | B(Fair) | B(Fair) | B(Fair) |
| Example 15 | 50 | 20 | 15 | A(Good) | B(Fair) | B(Fair) |
| Example 16 | 50 | 20 | 15 | A(Good) | A(Good) | B(Fair) |

TABLE 2-2

| | Amorphous polyester resin mass % | Crystalline polyester resin mass % | Vinyl resin mass % | Colored streaks | Colored spots | Yield |
|---|---|---|---|---|---|---|
| Example 17 | 60 | 15 | 10 | A(Good) | A(Good) | A(Good) |
| Example 18 | 60 | 15 | 10 | A(Good) | B(Fair) | A(Good) |
| Example 19 | 70 | 10 | 5 | A(Good) | B(Fair) | B(Fair) |
| Example 20 | 50 | 20 | 15 | A(Good) | B(Fair) | A(Good) |
| Example 21 | 50 | 20 | 15 | A(Good) | A(Good) | A(Good) |
| Example 22 | 50 | 20 | 15 | A(Good) | A(Good) | B(Fair) |
| Example 23 | 50 | 20 | 15 | A(Good) | B(Fair) | B(Fair) |
| Example 24 | 50 | 20 | 15 | A(Good) | A(Good) | B(Fair) |
| Example 25 | 50 | 20 | 15 | A(Good) | A(Good) | A(Good) |
| Example 26 | 40 | 35 | 10 | A(Good) | B(Fair) | A(Good) |
| Example 27 | 45 | 30 | 10 | A(Good) | A(Good) | A(Good) |
| Example 28 | 65 | 10 | 10 | A(Good) | A(Good) | B(Fair) |
| Example 29 | 67 | 8 | 10 | A(Good) | A(Good) | B(Fair) |
| Example 30 | 50 | 20 | 15 | A(Good) | A(Good) | A(Good) |
| Example 31 | 50 | 20 | 15 | B(Fair) | B(Fair) | B(Fair) |
| Comparative example 1 | 50 | 20 | 15 | C(Poor) | C(Poor) | A(Good) |
| Comparative example 2 | 60 | 25 | 0 | C(Poor) | C(Poor) | A(Good) |

The above results confirm that the method for producing a toner which is used in Examples is a method for producing a toner that may reduce the occurrence of colored streaks or colored spots.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing an electrostatic image developing toner, the method comprising:

a step 1 of producing toner particles by a wet process, the toner particles including an amorphous polyester resin, a crystalline polyester resin, and a vinyl resin; and a step 2 of bringing acidic water, consisting of an aqueous solution of a monovalent acid having a pKa in water at 25° C. of −10 or more and 4.5 or less, and having an acid concentration of 0.5 mmol/L or more and 8 mmol/L or less measured prior to contact with the toner particles, into contact with the toner particles, wherein the step 2 reduces a sodium content on surfaces of the toner particles.

2. The method for producing an electrostatic image developing toner according to claim 1, wherein a drop from a Na content in surfaces of the toner particles that have not been subjected to the step 2 (Na contentBefor) to a Na content in the surfaces of the toner particles that have been subjected to the step 2 (Na contentAfter) is 0.10 mg/L or more and 2.0 mg/L or less, and wherein the Na content in the surfaces of the toner particles that have been subjected to the step 2 (Na contentAfter) is 0.05 mg/L or more and 0.4 mg/L or less.

3. The method for producing an electrostatic image developing toner according to claim 1, the method further comprising:

a step 3 of, subsequent to the step 2, bringing wash water B into contact with the toner particles, wherein a rise from an anion content in the surfaces of the toner particles that have not been subjected to the step 2 (anion contentBefor) to an anion content in the surfaces of the toner particles that have been subjected to the step 2 (anion contentAfter2) is 1 mg/L or more and 5 mg/L or less, and wherein an anion content in the surfaces of the toner particles that have been subjected to the step 3 (anion contentAfter3) is 0.001 mg/L or more and 0.1 mg/L or less.

4. The method for producing an electrostatic image developing toner according to claim 1, wherein the acidic water having an acid concentration of 0.5 mmol/L or more and 8 mmol/L or less has a temperature of 35° C. or less.

5. The method for producing an electrostatic image developing toner according to claim 1, wherein the acidic water is an aqueous nitric acid solution.

6. The method for producing an electrostatic image developing toner according to claim 1, the method further comprising:

a step of, prior to the step 2, bringing wash water A into contact with the toner particles.

7. The method for producing an electrostatic image developing toner according to claim 6, wherein a mass of the wash water A is 150% by mass or more and 2,000% by mass or less of a total mass of the toner particles.

8. The method for producing an electrostatic image developing toner according to claim 1, wherein a mass of the crystalline polyester resin included in the toner particles is 10% by mass or more and 30% by mass or less of a total mass of the toner particles.

* * * * *